United States Patent [19]
Challener et al.

[11] Patent Number: 6,081,793
[45] Date of Patent: Jun. 27, 2000

[54] METHOD AND SYSTEM FOR SECURE COMPUTER MODERATED VOTING

[75] Inventors: David C. Challener, Raleigh; Richard A. Kelley; Palmer E. Newman, both of Apex, all of N.C.

[73] Assignee: International Business Machines Corporation, Armonk, N.Y.

[21] Appl. No.: 09/001,180

[22] Filed: Dec. 30, 1997

[51] Int. Cl.[7] ............................... H04L 9/30; G06F 17/60
[52] U.S. Cl. .............................. 705/50; 705/12; 713/155; 713/180; 235/386; 380/30
[58] Field of Search ..................... 705/12, 50; 235/386; 380/23, 25, 49, 28, 30; 434/306; 713/180, 155, 175

[56] References Cited

U.S. PATENT DOCUMENTS

| | | | |
|---|---|---|---|
| 5,218,528 | 6/1993 | Wise et al. | 705/12 |
| 5,412,727 | 5/1995 | Drexler et al. | 380/24 |
| 5,682,428 | 10/1997 | Johnson | 380/23 |
| 5,682,430 | 10/1997 | Kilian et al. | 380/30 |
| 5,878,399 | 3/1999 | Peralto | 705/12 |
| 5,903,652 | 5/1999 | Mital | 380/25 |

OTHER PUBLICATIONS

Bruce Schneier, "Applied Cryptography: Protocols, Algorithms, and Source Code in C", 2nd edition John Wiley and Sons, N.Y. (1995) pp. 125–134 (Secure Elections).

Graeme Browning, "Ballot Lines", National Journal Apr. 20, 1996 vol. 28, No. 16, start p. 879.
Cyber Rights Digest, pp. 1–12.
Electronic Voting On–Line, pp. 1–5.
Life and Politics on the Net, pp. 1–3.
1995 International Carnahan Conference on Security Technology, L. Sanson.

*Primary Examiner*—Pinchus M. Laufer
*Attorney, Agent, or Firm*—George E. Grosser; Andrew Dillon

[57] ABSTRACT

A method and system is provided for improved electronic voting. The system optionally allows paper type ballots to be utilized. A plurality of cryptographic routines are utilized in a distributed data processing system to maximize the privacy of both the voter's identity and the content of completed ballots. An authentication server is utilized to interact with a voter to issue electronic ballots and receive completed electronic ballots in a manner which determines the authenticity of the identification of the voter, while maintaining the content of the completed ballot confidential. The distributed data processing system further includes a results server which tabulates the content of completed ballots in a manner which maintains the identity of the voters associated with the particular ballots confidential. The distributed data processing system may further include a journal server which records completed ballots, in a manner which facilitates the challenge of ineligible votes and the correction of erroneous votes.

12 Claims, 13 Drawing Sheets

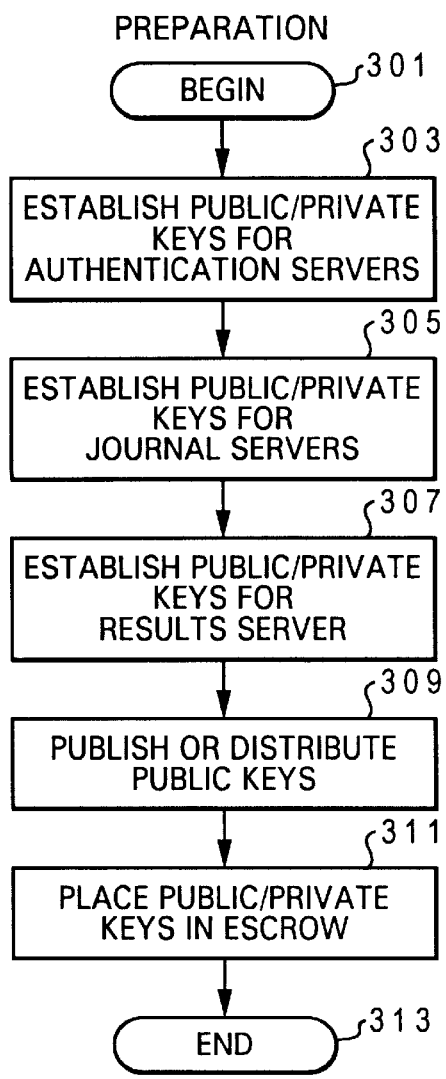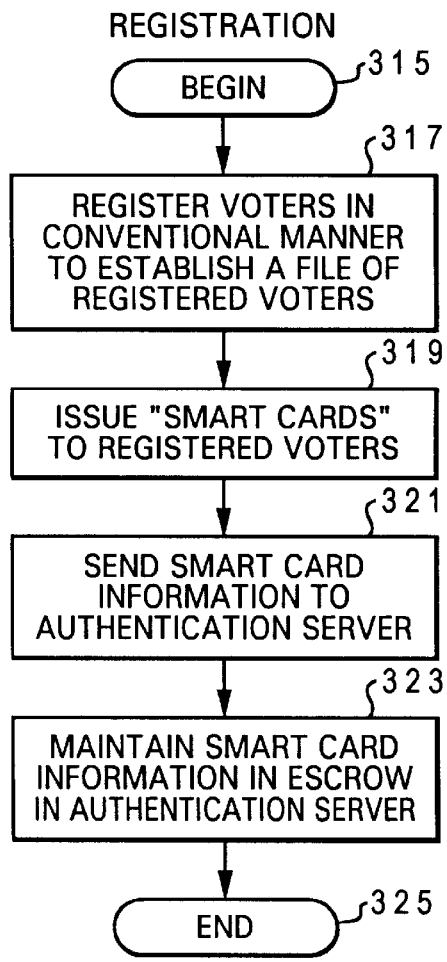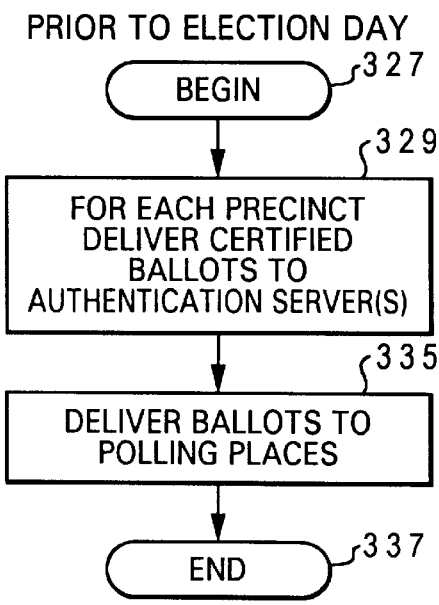
Fig. 3
Fig. 4
Fig. 5

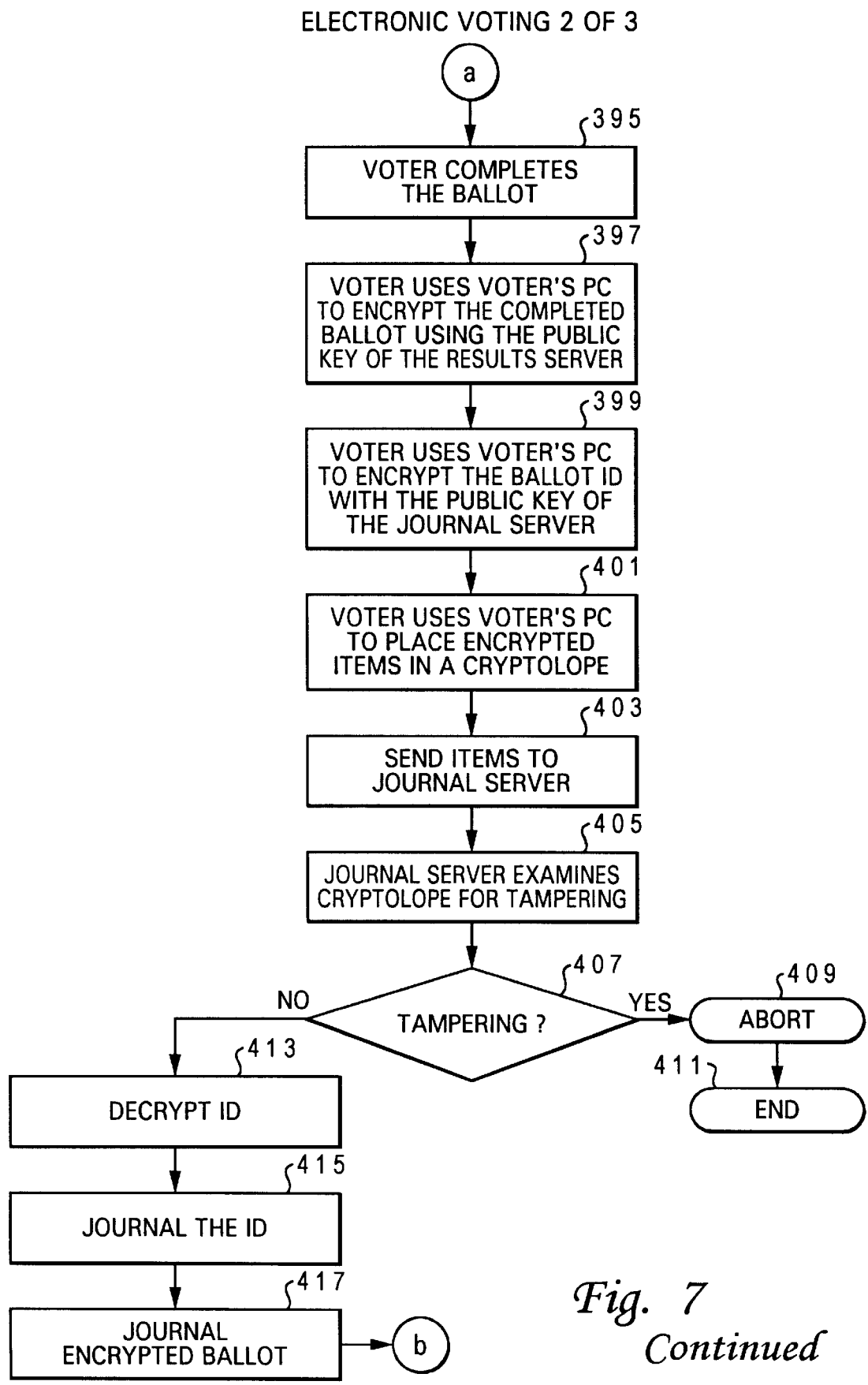

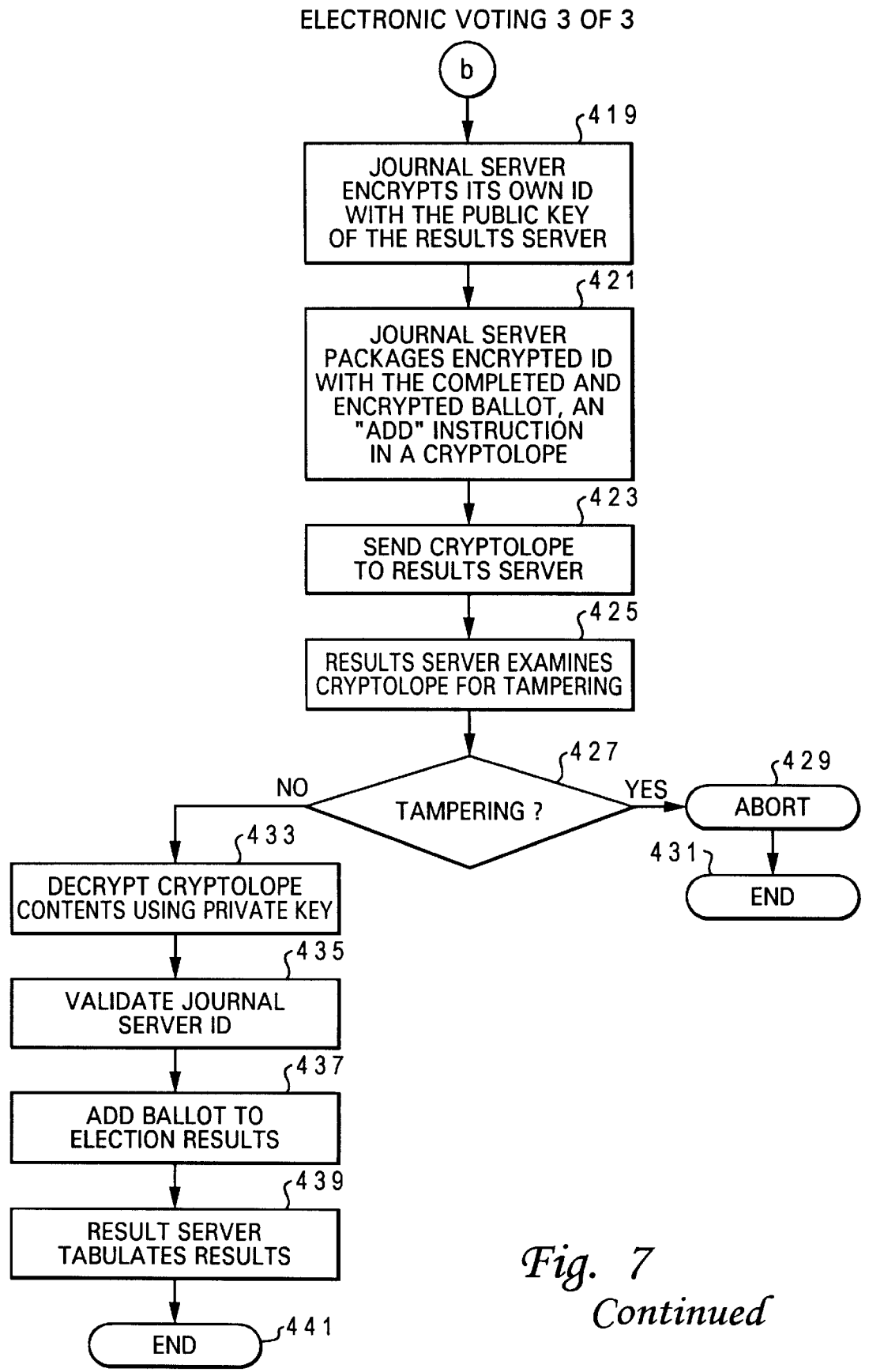

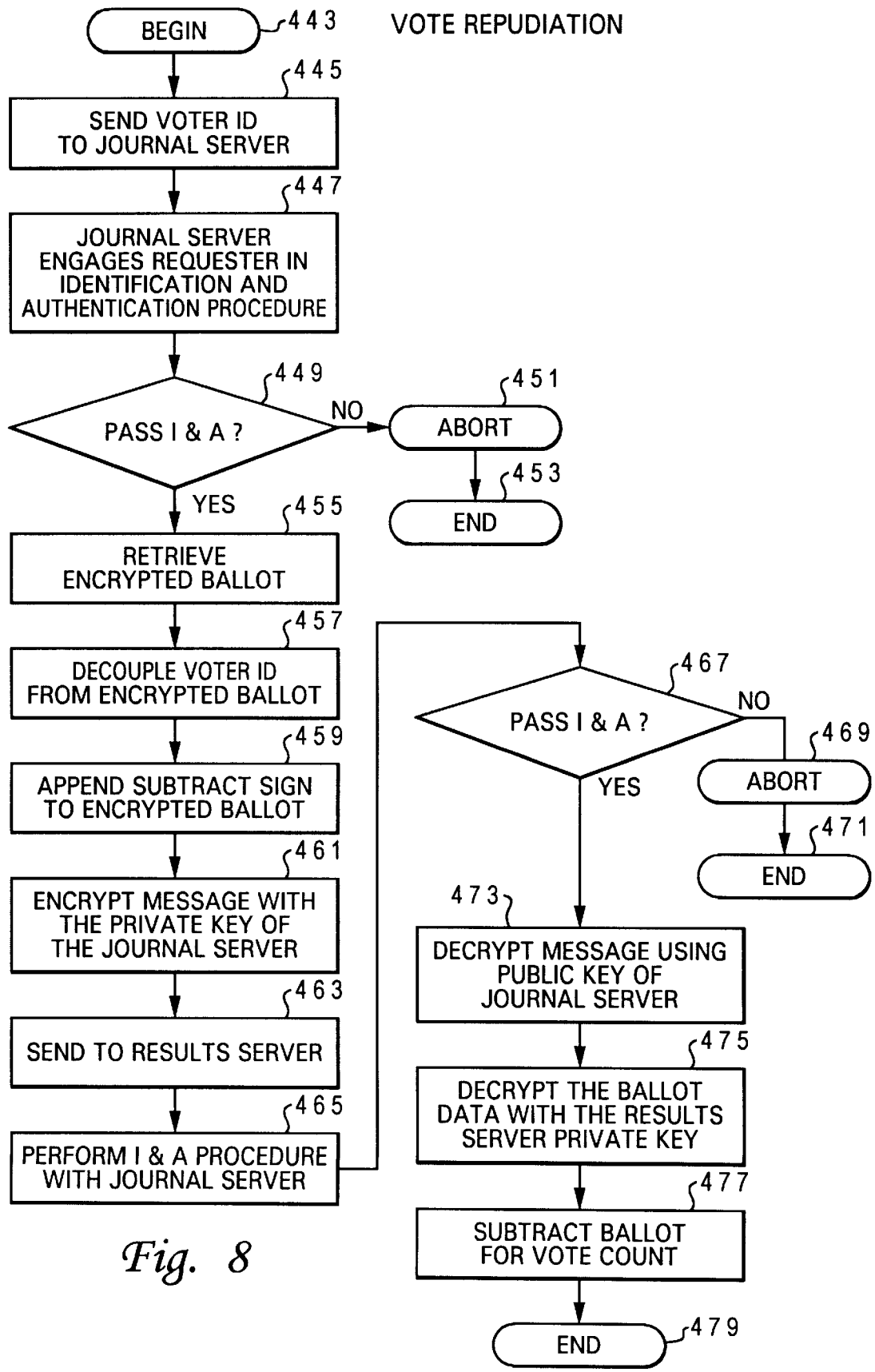

VO = encrypted with voter's private key
VX = encrypted with voter's public key
AO = encrypted with Authenticator's private key
AX = encrypted with Authenticator's public key
CX = encrypted with Ballot Counter's public key
CO = encrypted with Ballot Counter's private key
*Fig. 9A*
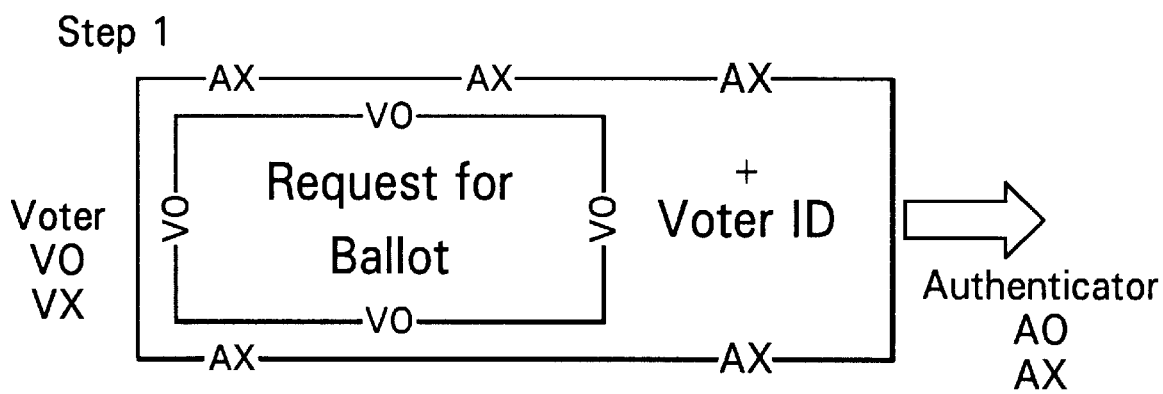
*Fig. 9B*
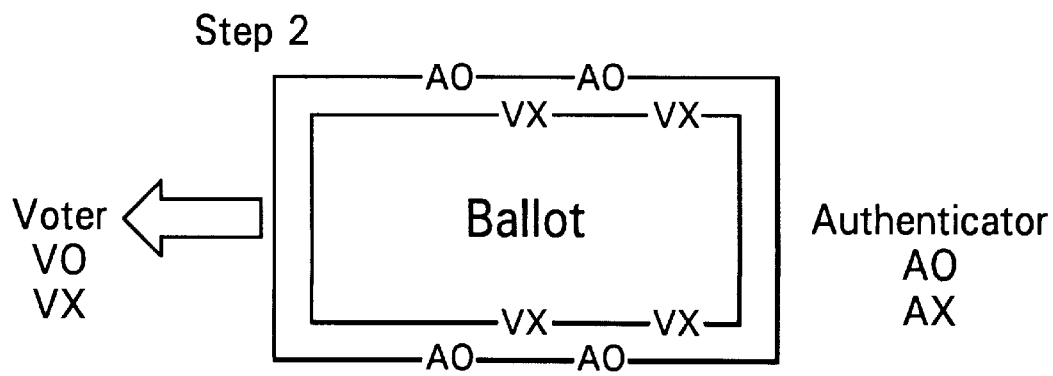
*Fig. 9C*

METHOD AND SYSTEM FOR SECURE COMPUTER MODERATED VOTING

BACKGROUND OF THE INVENTION

1. Technical Field

The present invention relates in general to voting systems which are implemented at least in part utilizing data processing systems.

2. Description of the Related Art

In recent years, there has been a substantial increase in the number of governments throughout the world which have adopted the western model of government, in which "qualified" and "registered" voters elect a variety of local, state, and federal officials to particular offices. Traditionally, western-style elections were conducted utilizing paper ballots which were issued to registered voters at particular polling places. This requires the physical attendance of the voter at a particular polling place in order to allow voting. In western countries, such as the United States of America, voter participation has been poor, perhaps largely due to the burdens of work and family which make fairly strenuous demands on the citizens. Another problem associated with western-style elections is the tremendous expense associated with conducting the elections in a manner which renders the election results substantially free from corruption and error. The goals of maximizing convenience, minimizing expense, and minimizing security risks are also found in developing nations which have adopted western-style democracies, but security problems abound in nations with a new found interest in western-style democracy, particularly in nations which have had a long history of autocratic, dictatorial, or military rule, in which past elections offered either no real choice, or in which voting fraud and corruption were prevalent.

Two other concerns also figure prominently in systems which enable democratic elections. The first concern is the voter's right of privacy to his or her voting decisions. The second consideration is the ease with which particular votes can be challenged (for lack of "qualification" of the voter) and corrected without presenting risks to the security and privacy of the votes in general.

The rising importance of the internet and other forms of electronic communication in the United States of America and abroad presents a unique opportunity to reduce the inconvenience and expense associated with traditional voting systems. However, there are a considerable number of concerns about security and privacy which will have to be met before the internet and/or other forms of electronic communication becomes viable as a substitute for or supplement to traditional paper ballot type elections.

SUMMARY OF THE INVENTION

It is one objective of the present invention to provide an improved method and system for voting which allows for both paper-type ballots utilized at polling places as well as electronic voting utilizing the internet and any other form of electronic communication, which maintains the same level of security and privacy in both voting systems.

It is another objective of the present invention to provide an improved method and system of voting which can accommodate the various legal and regulatory requirements on a voting system, while reducing the costs associated with the voting operation.

It is yet another objective of the present invention to provide an improved method and apparatus for enabling voting which allows fraudulent or challenged votes to be removed from the vote count without jeopardizing the privacy of any particular vote or voter.

It is yet another objective of the present invention to provide an improved method and system for facilitating voting which provides a secure system for tabulating the election results and providing election results.

The foregoing objectives are achieved as is now described.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a flowchart representation of the preparation activities which must occur in advance of the voting operations in accordance with the preferred embodiment of the present invention;

FIG. 4 is a flowchart representation of the registration process in accordance with the preferred embodiment of the present invention;

FIG. 5 is a flowchart representation of activities which must occur just prior to election day in accordance with the present invention;

FIG. 8 is a flowchart representation of the vote reputation process in accordance with the preferred embodiment of the present invention; and FIGS. 9A, 9B, 9C, 9D, and 9E are block diagram representations of the encryption and other operations which occur in accordance with the preferred embodiment of the present invention.

DETAILED DESCRIPTION OF PREFERRED EMBODIMENT

Figure 1A:
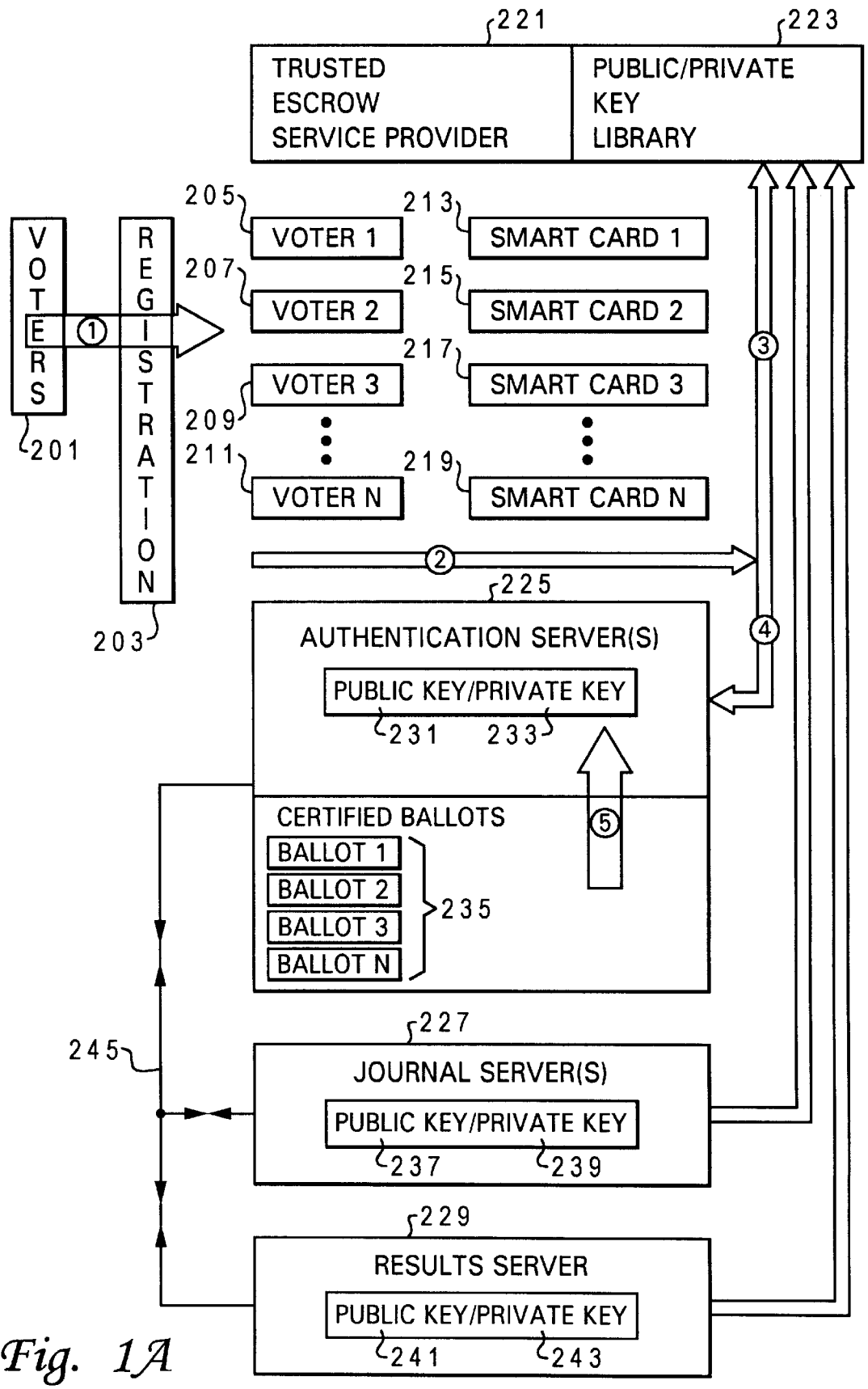
FIG. 1A is a block diagram representation of the improved method and system of the present invention for secure computer moderated voting.

FIG. 1A is a block diagram representation of the components which cooperate in the improved method and system for enabling computer moderated voting in accordance with the present invention. As is shown, voters 201 undergo a registration process 203 in order to become "qualified" to vote in an upcoming election. As is shown, and in accordance with the present invention, voters 205, 207, 209, 211 are all registered to vote in accordance with the statutory and regulatory requirements. In accordance with the preferred embodiment of the present invention, voters 205, 207, 209, 211 are each issued an individual "smart card" which is utilized during voting in accordance with the preferred embodiment of the present invention. Voter 205 is issued smart card 213. Voter 207 is issued smart card 215. Voter 209 is issued smart card 217. Voter 211 is issued smart card 219.

Figure 2A:
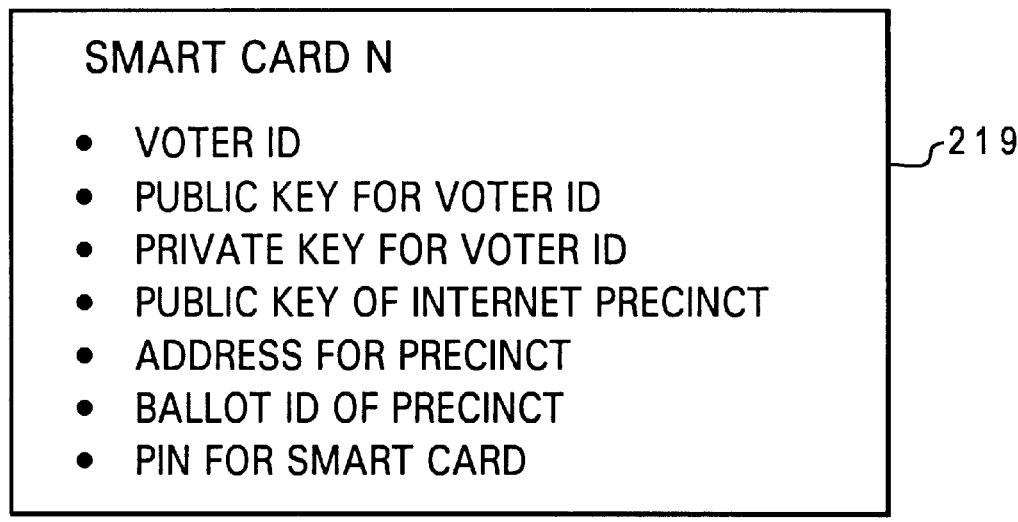
FIG. 2A is a block diagram representation of "smart cards" which may be issued to voters, after registration, in one embodiment of the method and system of the present invention.
Figure 2B:
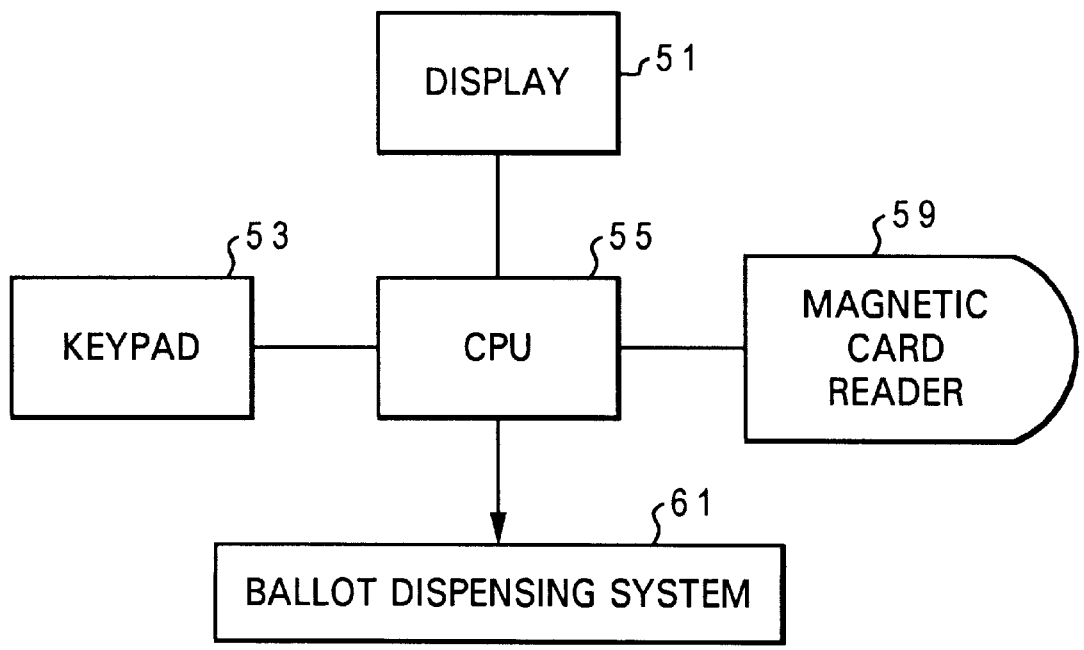
FIG. 2B is a block diagram representation of a device for reading the smart card of FIG. 2A.

The information contained on each smart card is depicted in block diagram form in FIG. 2A. As is shown, smart card 219 includes the voter identification, the public key associated with that voter identification, a private key associated with that particular voter identification, a public key of an internet precinct which is provided as an option to the voter should he or she elect to vote via electronic means utilizing the internet and/or any other novel or conventional data communication system, the address for a physical precinct should he or she elect to vote in a conventional manner in person at a polling place, a ballot ID for the particular precinct assigned to the voter, and a PIN number for the smart card which provides a personal identification associated with that particular voter. FIG. 2B depicts in block diagram a system for reading the smart card. It includes a display 51, a keypad 53, a CPU 55, a magnetic card reader 59, and a ballot dispensing system. Before a ballot is dispensed, the PIN entered by the voter must match the PIN carried by the smart card and read by the magnetic card reader 59.

Returning now to FIG. 1A, all the information contained in the smart cards is passed to authentication server 225 conditionally, and optionally, the information from the smart cards may be passed to a trusted escrow service provider 221 which maintains a public/private key library 223, wherein the public keys are available to the public, and the private keys are maintained in strict confidentiality.

In accordance with the present invention, three separate data processing servers collaborate in order to maximize security and privacy throughout the voting process. One or more authentication servers are identified to particular electronic precincts and conventional precincts. Each authentication server has a public key and a private key associated with it. For purposes of simplifying the exposition, a single authentication server 225 is depicted in FIG. 1A. It has associated with it a public key 231, and a private key 233. Authentication server 225 has associated with it a plurality of certified ballots 235 which may be dispensed as a paper-type ballot or as an electronic ballot, provided that the voter meets the security and other requirements of the present invention as will be discussed below. A journal server is also provided. In practice, many journal servers may be provided with each journal server being identified with one or more particular authentication servers. The journal server 245 depicted in FIG. 1A is shown as being associated with a public key 237 and a private key 239. One or more results servers may also be provided which interact with the journal server to tabulate votes and present election results. The result server 229 depicted in FIG. 1A has associated with it a public key 241 and a private key 243.

In accordance with the preferred embodiment of the present invention, the voter (utilizing his or her smart card and/or his or her personal computer) interacts with the authentication server 225. Authentication server 225 in turn interacts with journal server 227. Journal server 227 interacts with result server 229.

In accordance with the preferred embodiment of the present invention, one or more cryptographic operations are utilized to encrypt data flows between the voter (and his or her smart card and/or personal computer), and the authentication servers, the journal servers, and the results servers. Preferably, but not necessarily, a public-key, private-key cryptographic routine is utilized. Many of such routines are now currently commercially available. One example of a commercially-available public-key, private-key routine is the RSA Program. In public-key cryptography, there are two keys. A message is encrypted with one key and can be decrypted with the other key. Usually, one key is private and the other key is public. A good discussion of the commercially available cryptographic routines can be found at "Applied Cryptography," by Bruce Schneier, published by John Wiley & Sons, Inc., more precisely identified by International Standard Book Number ISBN O-471-59756-2.

Figure 1B:
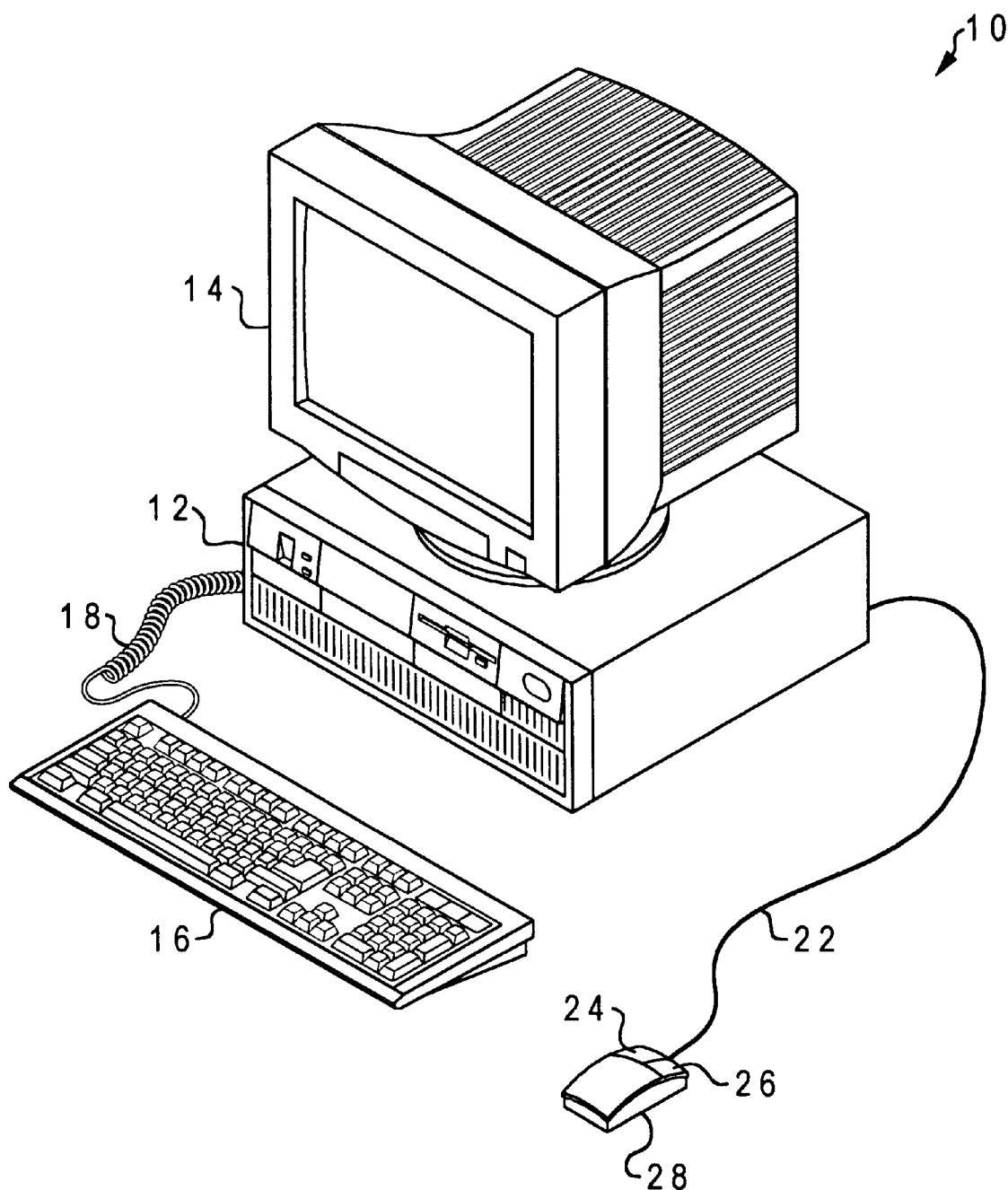
FIGS. 1B and 1C depict the types of data processing systems that can be utilized to implement the present invention.

The servers identified above in FIG. 1A can be any conventional data processing device. With reference now to the figures and in particular with reference to FIG. 1B, there is depicted a pictorial representation of data processing system 10 which may be programmed in accordance with the present invention. As may be seen, data processing system 10 includes processor 12 which preferably includes a graphics processor, memory device and central processor (not shown). Coupled to processor 12 is video display 14 which may be implemented utilizing either a color or monochromatic monitor, in a manner well known in the art. Also coupled to processor 12 is keyboard 16. Keyboard 16 preferably comprises a standard computer keyboard which is coupled to the processor by means of cable 18.

Also coupled to processor 12 is a graphical pointing device, such as mouse 20. Mouse 20 is coupled to processor 12, in a manner well known in the art, via cable 22. As is shown, mouse 20 may include left button 24, and right button 26, each of which may be depressed, or "clicked", to provide command and control signals to data processing system 10. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that data processing system 10 may be implemented utilizing a so-called personal computer.

The method and system of the present invention may be implemented in a distributed data processing environment. With reference now to the figures and in particular with reference to FIG. 1C, there is depicted a pictorial representation of a distributed data processing system 108 which may be utilized to implement the method and system of the present invention. As may be seen, distributed data processing system 108 may include a plurality of networks, such as Local Area Networks (LAN) 110 and 132, each of which preferably includes a plurality of individual computers 112 and 130, respectively. Of course, those skilled in the art will appreciate that a plurality of Intelligent Work Stations (IWS) coupled to a host processor may be utilized for each such network. Any of the processing systems may also be connected to the internet as shown.

As is common is such data processing systems, each individual computer may be coupled to a storage device 114 and/or a printer/output device 116. One or more such storage devices 114 may be utilized, in accordance with the method of the present invention, to store the various data objects or documents which may be periodically accessed and processed by a user within distributed data processing system 108, in accordance with the method and system of the present invention. In a manner well known in the prior art, each such data processing procedure or document may be stored within a storage device 114 which is associated with a Resource Manager or Library Service, which is responsible for maintaining and updating all resource objects associated therewith.

Figure 1C:
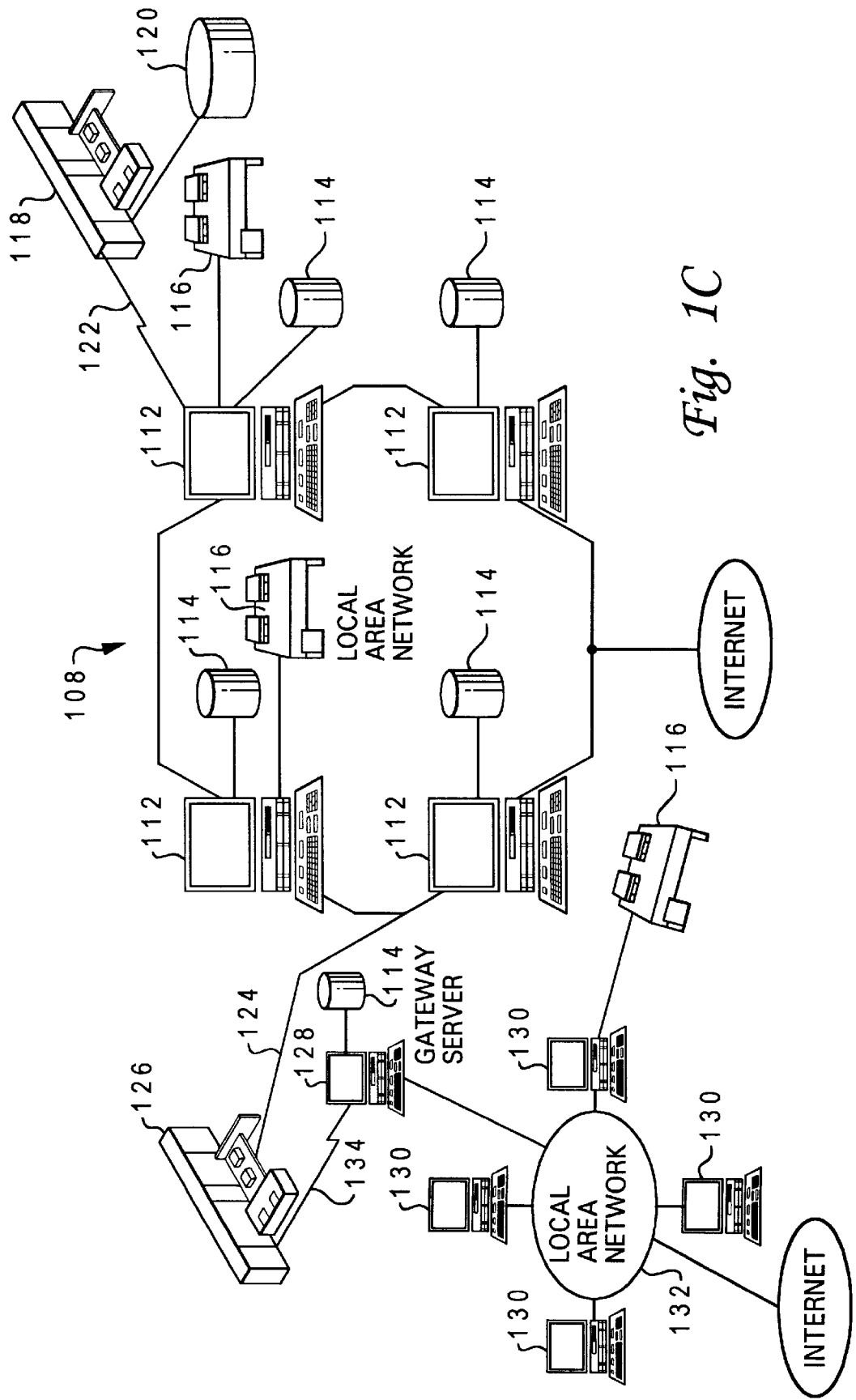

Still referring to FIG. 1C, it may be seen that distributed data processing system 108 may also include multiple mainframe computers, such as mainframe computer 118, which may be preferably coupled to Local Area Network (LAN) 110 by means of communications link 122. Mainframe computer 118 may also be coupled to a storage device 120 which may serve as remote storage for Local Area Network (LAN) 110. A second Local Area Network (LAN) 132 may be coupled to Local Area Network (LAN) 110 via communications controller 126 and communications link 134 to a gateway server 128. Gateway server 128 is preferably an individual computer or Intelligent Work Station (IWS) which serves to link Local Area Network (LAN) 132 to Local Area Network (LAN) 110.

As discussed above with respect to Local Area Network (LAN) 132 and Local Area Network (LAN) 110, a plurality of data processing procedures or documents may be stored within storage device 120 and controlled by mainframe computer 118, as Resource Manager or Library Service for the data processing procedures and documents thus stored.

Of course, those skilled in the art will appreciate that mainframe computer 118 may be located a great geographical distance from Local Area Network (LAN) 110 and similarly Local Area Network (LAN) 110 may be located a substantial distance from Local Area Network (LAN) 132. That is, Local Area Network (LAN) 132 may be located in California while Local Area Network (LAN) 110 may be located within Texas and mainframe computer 118 may be located in New York.

As will be appreciated upon reference to the foregoing, it is often desirable for users within one portion of distributed data processing network 108 to access a data object or document stored in another portion of data processing network 108. In order to maintain order within the documents stored within data processing network 108 it is often desirable to implement an access control program. This is generally accomplished by listing those users authorized to access each individual data object or document, along with the level of authority that each user may enjoy with regard to a document within a Resource Manager or Library Service. In this manner, the data processing procedures and documents may be accessed by enrolled users within distributed data processing system 108 and periodically "locked" to prevent access by other users.

Figure 6:
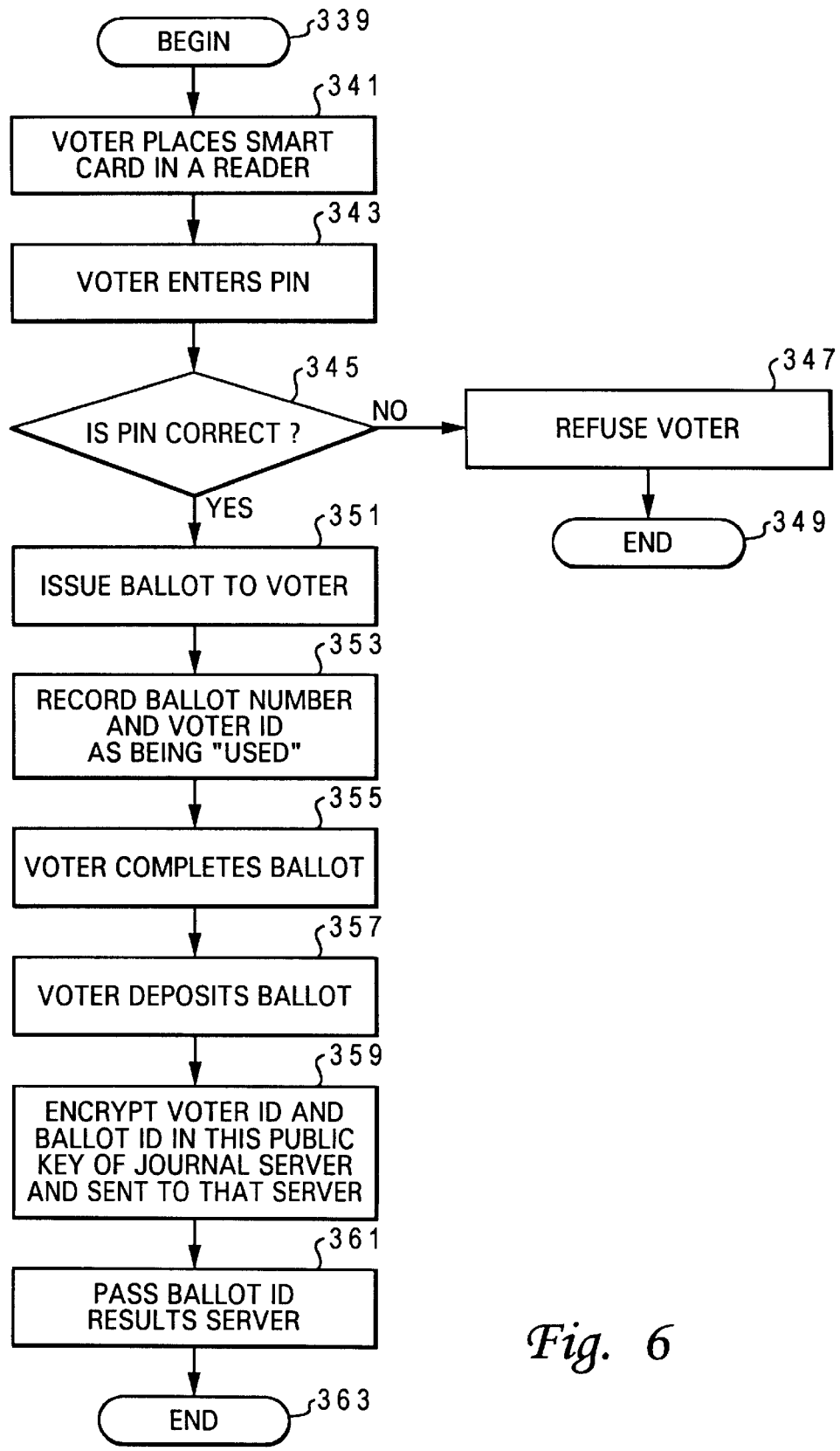
FIG. 6 is a flowchart representation of voting activities occurring at polling places utilizing conventional paper ballots, in accordance with the preferred embodiment of the present invention.
Figure 7:
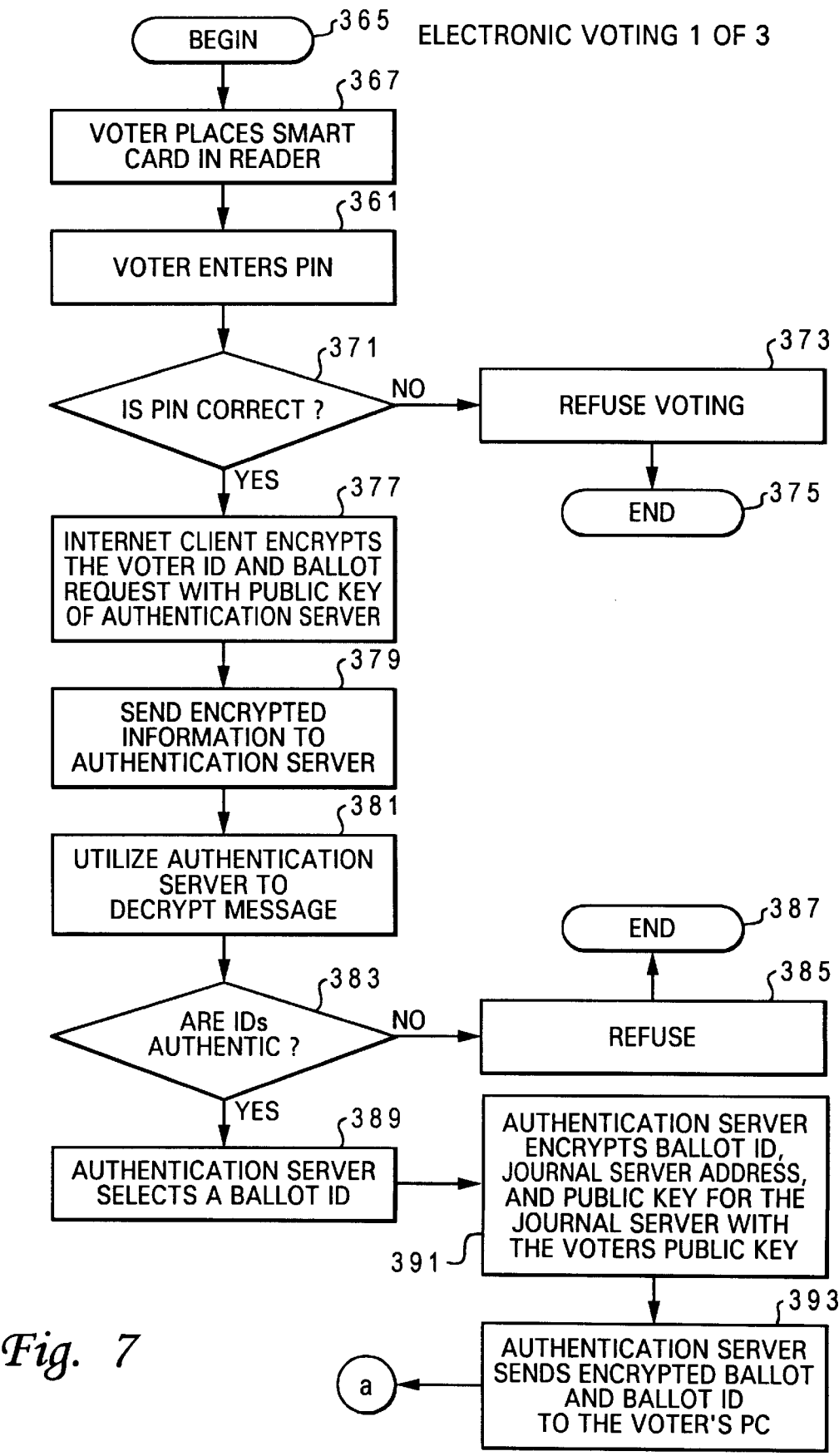
FIG. 7 is a flowchart representation of electronic voting in accordance with the preferred embodiment of the present invention.

The preferred embodiment of the present invention can best be understood with reference to the flowcharts and block diagram depictions of FIGS. 3 through 9E. FIG. 3 is a flowchart representation of steps which must be taken in preparation for implementation of the improved method and system of the present invention. FIG. 4 is a flowchart representation of the voter registration process as modified by the improved method and system of the present invention. FIG. 5 is a flowchart representation of activities which must occur prior to the election day, in accordance with the preferred embodiment of the present invention. FIG. 6 is a flowchart representation of the voting that may occur at polling places utilizing paper ballots, as modified by the preferred embodiment of the present invention. FIG. 7 is a flowchart representation of electronic voting in accordance with the preferred embodiment of the present invention. FIG. 8 is a flowchart representation of a vote repudiation process conducted in accordance with the preferred embodiment of the present invention. FIGS. 9A, 9B, 9C, 9D, and 9E are block diagram representations of the encryption operations which are performed in the preferred embodiment of the present invention.

Turning first to FIG. 3, there is depicted a flowchart representation of the preparatory activities which must be conducted in order to implement the preferred embodiment of the present invention. The process commences at block 301, and continues at block 303, wherein public and private keys are established for the authentication servers which are utilized for particular election. Next, in accordance with block 305, public and private keys are established for the journal servers for the particular election. Then, in accordance with block 307, public and private keys are established for the results server for the particular election. Next, in accordance with block 309, the public keys are published and/or distributed. Finally, the public/private keys are placed in escrow, such as a trusted escrow service provider or with the particular servers as will be discussed herebelow, in accordance with the preferred embodiment of the present invention. The process ends at block 313.

FIG. 4 is a flowchart representation of how the improved method and system of the present invention affects the voter registration process. In most respects, the voter registration process will proceed in a conventional manner, in order to determine eligibility to vote. Each jurisdiction has qualifications on the fundamental requirements for a voting citizen. It is through the registration process that ineligible voters are blocked or screened from obtaining a voter registration status.

With reference now to FIG. 4, the process commences at block 315, and continues at block 317, wherein voters are registered in a conventional manner to establish a file of registered voters. Then, in accordance with block 319, smart cards (such as the cards depicted in block diagram form in FIG. 2), are issued to the registered voters. Then, in accordance with block 321, the information contained on the smart card is sent to the authentication server. The authentication server will be the server which is responsible for the primary interaction with the voter. Additionally, the information contained in the smart cards (for a particular precinct associated with the authentication server) is maintained in escrow within the authentication server. The process ends at block 325.

FIG. 5 is a flowchart representation of activities which must occur just prior to the election day. The process begins at block 327, and continues at block 329, wherein, for each precinct, certified ballots are delivered to the authentication server. A certified ballot may carry with it a unique number and/or stamp and/or electronic signature or watermark which presents it with attributes which are unique and allow it to be differentiated from every other ballot. Then, in accordance with block 335, paper ballots are delivered to the polling places. The process ends at block 337. In accordance with the preferred embodiment of the present invention, the voter may make his or her choice between voting electronically utilizing a distributed data processing system and/or the internet, or he or she may choose to physically show up at the polling place and vote utilizing a paper ballot.

FIG. 6 depicts the utilization of the option of voting at the polling place with a paper ballot, while FIG. 7 depicts the option of voting electronically.

FIG. 6 represents the voting process utilizing paper ballots and commences at software block 339. The process continues at software block 341, wherein the voter places his or her smart card in a card reader at the polling site. Next, in accordance with block 343, the voter enters his or her personal identification number into the keyboard associated with the card reader. Then, in accordance with block 345, the card reader and associated authentication server cooperate to determine whether the PIN number is correct. In other words, the data processing system compares the PIN number maintained in the magnetic memory associated with the smart card to the PIN number entered by the voter. If the PIN numbers match, the voting process continues. However, if the PIN numbers do not match, control passes to block 347, wherein the data processing system refuses further action by the voter, and ends the voting process in accordance with block 349. If the PIN numbers match, the voting process continues at block 351, wherein the voter is issued a paper ballot. Next, in accordance with block 353, the data processing system records the ballot number and voter ID as being "used" thus preventing that particular voter from voting again in this election. In accordance with block 355, the voter completes the ballot, in a conventional manner utilizing the pencils or pens provided at the polling place to fill in the one or more dots on the paper ballot or with a mechanical stylus which is utilized to perforate portions of the ballot. Under either system, the completed ballot is in a machine readable form at the termination of completion of the ballot. Next, in accordance with block 357, the voter deposits the ballot at the polling place. Typically, this is done utilizing optical scanning devices which contain a lock box for the paper ballots and which keep a running count of the ballots deposited therein in electronic memory, and which typically displays the total number of ballots within the machine or device in a display area accessible from the exterior of the machine. Then, in accordance with block 359, the authentication server encrypts the voter ID and ballot ID in the public key of the journal server and sends it to the journal server. Next, in accordance with block 361, the ballot is FIG. 7 is a flowchart representation of electronic voting conducted in accordance with the preferred embodiment of the present invention. The process beings at block 365, and continues at block 367, wherein the voter places his or her smart card in a card reader which is in communication with a data processing system under the control of the voter. Then, in accordance with block 361, the voter enters his or her PIN number. In accordance with block 371, the data processing system compares the PIN number entered by the voter to the PIN number read utilizing the smart card reader. If the PIN numbers do not match, the process continues at block 373, wherein the voting operation is refused, and the process ends at block 375. However, if the PIN number entered by the voter matches the PIN number read by the smart card reader, the process continues at block 377, wherein the data processing system operating as the "internet client" encrypts the voter identification (which may include any or all of the voter's name, address, voter registration number, social security number, driver's license number, or any other identifying data) and a "ballot request" with the public key of the authentication server. Then in accordance with block 379, the internet client sends the encrypted information to the authentication server. In accordance with block 381, the authentication server is utilized to decrypt the message to determine the identity of the voter. In accordance with block 383, the authentication server examines the identification information to determine whether the identification is authentic. If the identification does not appear to be authentic, voting is refused in accordance with block 385, and the process ends in accordance with block 387. However, if the identification appears to be authentic, processing continues at block 389, wherein the authentication server selects a ballot ID for the ballot that is going to be issued to the voter. In accordance with block 391, the authentication server encrypts the ballot ID, the journal server address, and the public key for the journal server with the voter's public key. Then, in accordance with block 393, the authentication server sends the encrypted ballot, and the ballot ID, to the voter's personal computer.

In accordance with block 395, the voter completes the ballot. Then in accordance with block 391, the voter uses the voter's PC to encrypt the completed ballot using the public key of the results server. Next, in accordance with block 399, the voter users the voter's PC to encrypt the ballot ID with the public key of the journal server. Then in accordance with block 401, the voter utilizes the voter's PC to place the encrypted items in a cryptolope, and sends the items to the journal server, in accordance with block 403.

The journal server examines the cryptolope, in accordance with block 405. In accordance with block 407, the journal server determines whether the cryptolope has been tampered with. If tampering is evident, the process continues at block 409 by aborting the operation, and the process ends at block 411. However, if it is determined in block 407 that no tampering has occurred with the cryptolope, then in accordance with block 413 the journal server decrypts the voter ID. Next, in accordance with block 415, the journal server then records (or "journals") the voter ID. Next in accordance with block 417, the journal then records or "journals" the encrypted ballot.

The journal server then encrypts its own ID with the public key of the results server, in accordance with block 419. In accordance with block 421, the journal server then packages the encrypted ID with the completed and encrypted ballot, and an "add" instruction in a cryptolope. Then in accordance with block 423, the journal server sends the cryptolope to the results server. The results server then examines the cryptolope in accordance with block 425. In accordance with block 427, determination is made as to whether the cryptolope has been tampered with. If there is evidence of tampering, control passes to block 429, wherein the process is aborted, and processing ends in accordance with block 431. However, if it is determined that there has been no tampering with the cryptolope, control passes to block 433, wherein the contents of the cryptolope are decrypted utilizing the private key of the results server. Next in accordance with block 435, the journal server identification is validated by the results server. In accordance with block 437, the ballot is added to the election results by the results server. Then in accordance with block 439, the results server tabulates the results at the end of the election, and the process ends at block 441.

FIG. 8 is a flowchart representation of a process which may be utilized to repudiate a vote which may be fraudulent or which may have been made by an ineligible or unregistered voter. The process commences at block 443, and continues at block 445, wherein the voter identification for the challenged voter is sent to the journal server. Next in accordance with block 447, the journal server engages the requester (or "challenger") in an identification and authentication procedure to ensure the authority of the requester or challenger. In accordance with block 449, if the requester does not pass the identification and authentication procedure, control passes to block 451, wherein the process is aborted, and processing ends in accordance with block 453. However, if it is determined that the requester passes the identification authentication procedure of block 449, control passes to block 455, wherein the encrypted ballot is retrieved by the journal server. Next in accordance with block 457, the voter's identification is decoupled from the encrypted ballot. Then in accordance with block 459, the journal server appends a "subtract" sign to the encrypted ballot to cause the contents of the ballot to be subtracted from the election results. Then in accordance with block 461, the journal server encrypts the message (which includes the encrypted ballot and the subtract sign) with the private key of the journal server. In accordance with block 463, the results of this encryption are passed to the results server. In accordance with block 465, the results server engages the journal server in an identification authentication procedure. If the journal server passes the identification and authentication procedure of block 467 control passes to block 473. However, if the journal server does not pass the identification authentication server, control passes to block 469, wherein the vote repudiation process is aborted, and processing ends at block 471. If the journal server passes the identification authentication procedure of block 467, the message from the journal server is decrypted utilizing the public key of the journal server, in accordance with block 473. Then in accordance with block 475, the ballot data is decrypted with the results server's private key. Then in accordance with block 477, the content of the ballot is subtracted from the vote count, and processing ends at block 479.

Figure 9D:
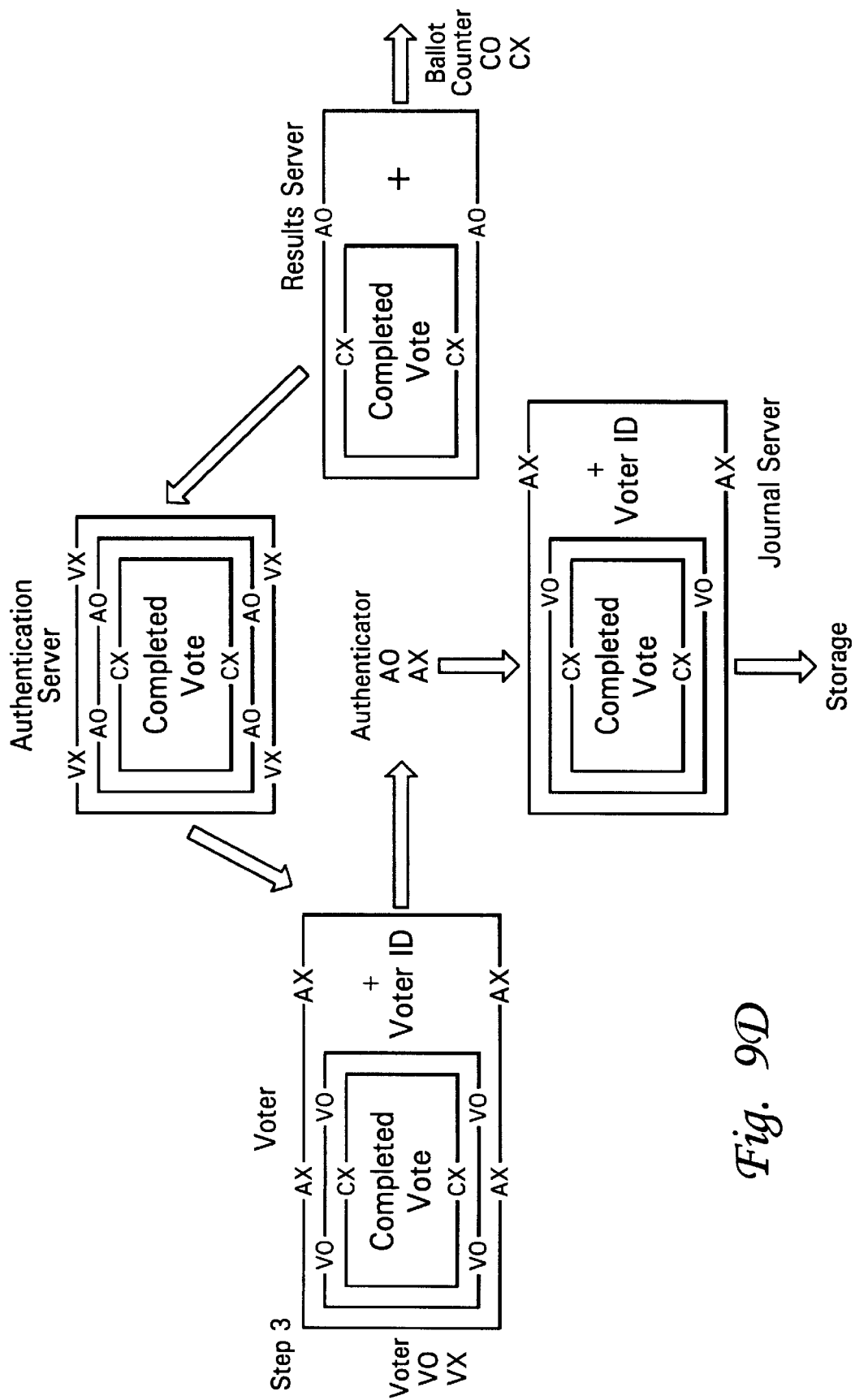

FIGS. 9A through 9E are block diagram representations of the encryption operations of the preferred embodiment of the present invention which have been described above in connection with flowcharts representative of the data processing implemented steps. FIG. 9A is a legend which is utilized for FIGS. 9B, 9C, 9D, and 9E which identify the keys utilized in a conventional public-key, private-key encryption operation. The letters "VO" designate encryption with the voter's private key. The letters "VX" indicate encryption with the voter's public key. The letters "AO" indicate encryption with the authenticator's private key. The letters "AX" indicate encryption with the authenticator's public key. The letters "CX" indicate encryption with the ballot counter's public key. The letters "CO" indicate encryption with the ballot counter's private key.

FIG. 9B indicates the first step of the operation, wherein the voter requests a ballot from the authentication server (or "authenticator"). As is shown, the voter possess a private key "VO" and a public key "VX." As is shown, the voter encrypts his or her request for a ballot with his or her private key "VO." This is added to the voter's identification. The encrypted request for ballot and the voter's identification are together encrypted by the authenticator's public key "AX." This encrypted message is passed to the authenticator. The authenticator utilizes the public and private keys as discussed above. The second step is depicted in FIG. 9C, wherein the authenticator has determined that the voter is eligible and properly identified. The authenticator then wants to pass a ballot, in a secure manner, to the voter. The ballot is encrypted utilizing the voter's public key "VX." The ballot is further encrypted utilizing the authenticator's private key "AO."

Returning now to FIG. 9B, the encryption of the request for ballot with the voter's private key "VO" proves to the authenticator that the request is from the voter, and not an imposter. The encryption of the ballot request and voter ID with the public key of the authenticator "AX" guarantees that only the authenticator can read the request for ballot. The authenticator utilizes the voter ID to look up the public key associated with a particular voter. Turning now to FIG. 9C, the encryption of the ballot with the voter's public key guarantees and proves that the ballot is meant for the voter that requested the ballot, and no other voter. The encryption of the ballot with the authenticator's private key "AO" proves that the ballot originated from the authenticator.

FIG. 9D depicts the process after the voter has completed the ballot. As is shown in FIG. 9D, the voter encrypts the completed vote with the public key of the ballot counter "CX." The voter then encrypts the encrypted completed vote with the private key of the voter. The voter then concatenates or adds the voter ID to the encrypted information and encrypts the entire package with the public key of the authenticator "AX." The entire package is sent to the authenticator. The authenticator verifies the vote is from the voter utilizing the public key of the voter "VX," but the authenticator cannot read the actual completed vote, thus ensuring privacy of the voting choices, since it is encrypted with the ballot counter's public key "CX." The authenticator checks to see if this vote is the first vote for this voter and if it has a valid time stamp. If so, the authenticator stores a copy of the encrypted message that came into storage (as is shown). The authenticator then wraps up what it is able to decrypt with its private key "AO" and then appends an "add" message or sign to the message which indicates that the contents of the ballot should be added to the total vote count. The authenticator then sends this information to the ballot counter. Preferably, the authenticator also sends back a copy of this entire message (that was sent to the ballot counter) to the voter, wrapped in the voter's public key "VX" to demonstrate to the voter that his or her vote has been counted. The voter can compare the vote sent to the ballot counter to the vote that he or she sent the authenticator, as encrypted.

These operations are all graphically depicted in FIG. 9D. As is shown, the completed vote is encrypted with the counter's public key "CX." The completed vote is also encrypted with the voter's private key "VO." The voter's ID is added to \this package and the entire package is encrypted with the authenticator's public key "AX." This package is sent to the authenticator. The authenticator sends back to the voter the completed vote encrypted first with the ballot counter's public key "CX," the authenticator's private key "AO," and finally by the voter's public key "VX." A copy of the completed vote as received by the authenticator from the voter is placed in storage. The authenticator sends to the ballot counter the completed vote encrypted first with the ballot counter's public key "CX" and with the authenticator's private key "AO." The plus sign in FIG. 9D (+) indicates that this completed ballot is to be added to the election tabulation.

The system utilizes encryption in a manner which allows the authenticator to perform all the functions associated with identifying that the voter is a registered and authentic voter, issuing a blank ballot to the voter, receiving the completed ballot, while maintaining the content of the completed ballot confidential, at least with respect to the authentication server. The system also utilizes encryption in a manner which allows the results server to perform all the functions associated with tabulation of the votes, correction of votes (as will be discussed below) and the challenge of votes, without requiring the result server to know the identity of the voter associated with the content of a particular vote. The system also utilizes a journal server to record the votes in a manner which secures the voter's identity and the content of the completed vote. The journal server is particularly useful in the correction of erroneous votes and the challenge of votes, since it provides a historical archive of the information utilized in a previous vote. This information will be necessary in order to correct erroneous votes or to delete successfully challenged votes.

Figure 9E:
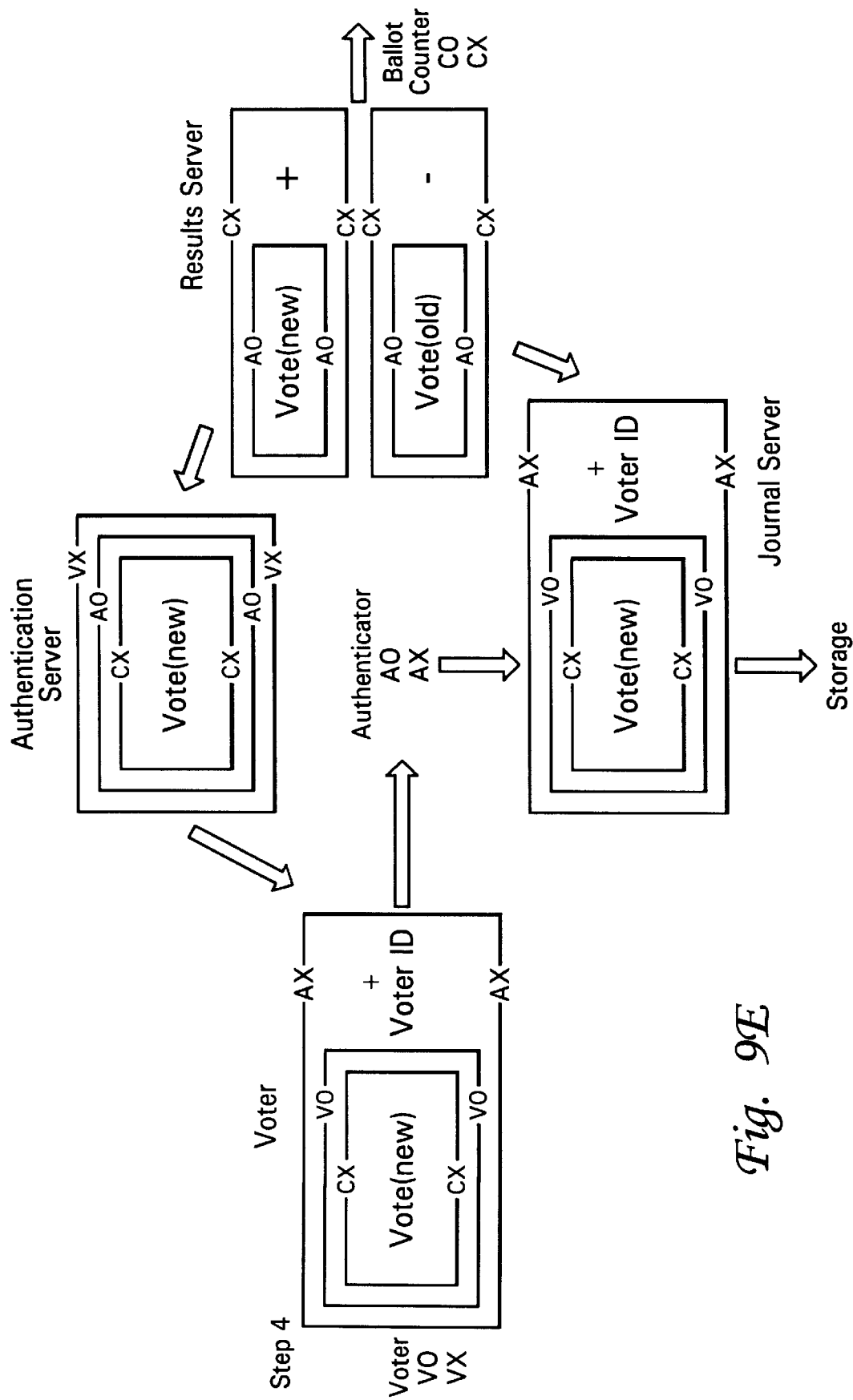

FIG. 9E is a block diagram representation of the encryption operations which are performed in order to correct an erroneous vote. In this scenario, the voter has previously voted but has completed the ballot in a manner which is incorrect and does not truly represent the voter's voting choices. Accordingly, the voter engages in an interaction with the authentication server in order to delete the previous vote and to replace that vote with a new vote. As is shown, the new vote is encrypted with the public key of the ballot counter "CX." This secures the content of the new vote from access by the authentication server. The new vote is then further encrypted with the private key of the voter "VO." This allows the identity and accuracy of the encrypted vote to be verified by the authentication server. This encrypted package is concatenated with the voter's identification and the entire package is encrypted with the public key of the authentication server. This further allows the authentication server to determine the authenticity of the voter's identity. The entire package is sent to the authenticator, and the entire package is stored as is shown in storage through operation of the journal server. The authentication server retrieves the old vote from the journal server, encrypts it utilizing the authentication server's private key "AO," appends a subtraction command (−) and then encrypts the entire package utilizing the public key of the ballot counter "CX." The authentication server also encrypts the new vote utilizing the private key of the authentication server "AO," appends an add command (+) to the encrypted vote and then encrypts the package utilizing the public key of the ballot counter "CX." The encrypted new vote and encrypted new vote and encrypted old vote are then passed to the ballot counter. The ballot counter decrypts the old and new votes and performs the addition and substraction operations as commanded, all without knowing the identity of the voter.

While the invention has been particularly shown and described with reference to a preferred embodiment, it will be understood by those skilled in the art that various changes in form and detail may be made therein without departing from the spirit and scope of the invention.

What is claimed is:

1. An improved method of electronic voting, comprising:
   (a) providing a data processing system under the control of a voter;
   (b) providing an authentication server data processing system;
   (c) providing a results server data processing system;
   (d) electronically communicating a ballot request and voter identification information in encrypted form from said voter to said authentication server;
   (e) utilizing said authentication server to determine the authenticity of said voter;
   (f) utilizing said authentication server to issue a blank ballot to said voter in the form of an encrypted electronic communication;
   (g) electronically communicating a completed ballot from said voter to said authentication server in encrypted form;
   (h) utilizing said authentication server to receive said encrypted completed ballot;
   (i) electronically communicating said encrypted completed ballot from said authentication server to said results server;
   (j) utilizing said results server to tabulate votes; and
   (k) removing the content of said completed ballot from the tabulation of votes if it is determined that said voter is ineligible for voting, after voting has occurred by said voter.

2. An improved method of electronic voting according to claim 1, wherein step (g) comprises:
   (g) electronically communicating a completed ballot from said voter to said authentication server encrypted in a manner which allows said authentication server to determine the identity of said voter, but which prevents said authentication server from determining the content of said completed ballot.

3. An improved method of electronic voting according to claim 1, wherein step (i) comprises:
   (i) electronically communicating said encrypted completed ballot from said authentication server to said results server, in a manner which allows said results server to determine the content of said completed ballot, but which prevents said results server from determining the identity of said voter.

4. An improved method of electronic voting according to claim 1, further comprising the step of:
   (l) replacing the content of a completed ballot which is deemed by said voter to be inaccurated with a substitute completed ballot.

5. An improved method of electronic voting according to claim 1, further comprising:
   (k) providing for said voter a machine readable card which includes identification information for said voter;
   (l) including in said machine readable card a confidential personal identification number associated with said voter; and
   (m) requiring utilization of said machine readable card and correct entry by said voter of said personal identification number as a prequisite for issuance of a ballot to said voter.

6. An improved method of electronic voting according to claim 5, further comprising the steps of:
   (n) issuing as an alternative to said electronic voting a paper ballot at a polling location identified to said voter; and
   (o) utilizing said machine readable card at said polling place by said voter for automated dispensation of a paper ballot.

7. An improved method of electronic voting according to claim 6, further comprising:
   (p) utilizing a reading device to read the content of said paper ballot after completion by said voter; and
   (q) integrating vote results from completed paper ballots with vote results from electronic ballots utilizing said results server.

8. An improved method of electronic voting, comprising:
   (a) providing a data processing system under the control of a voter;
   (b) providing an authentication server data processing system;
   (c) providing a results server data processing system;
   (d) electronically communicating at least the following among said data processing system under control of said voter, said authentication server, and said results server:

(1) a request for a ballot;
(2) an electronic ballot;
(3) a completed ballot;
(e) utilizing a plurality of cryptographic functions in order to allow access by said authentication server to information which identifies said voter;
(f) utilizing a plurality of cryptographic functions in order to prevent access by said authentication server to information contained in said completed ballot;
(g) utilizing a plurality of cryptographic functions to prevent access by said results server to information which identifies said voter;
(h) utilizing a plurality of cryptographic functions to allow access by said results server to the content of said completed ballot; and
(i) removing the content of said completed ballot, if it is determined that said voter is ineligible to vote, without allowing access to the content to said completed vote by said authentication server, and without allowing access to information identifying said voter by said results server.

9. An improved method of electronic voting according to claim 8, wherein said plurality of cryptographic functions comprise a plurality of public-key, private-key cryptographic transforms.

10. An apparatus for allowing electronic voting, comprising:
(a) a distributed data processing system;
(b) a plurality of sets of data processing instructions within said distributed data processing system including at least the following routines:
(1) a ballot request routine for allowing a voter to request an electronic ballot;
(2) a ballot dispensation routine for issuing an electronic ballot to said voter after said voter's identity has been authenticated;
(3) a ballot receiving routine for allowing receipt of a completed electronic ballot from said voter and recordation of the completed vote to prevent the issuance of additional ballots to said voter, in a manner which maintains the content of said completed ballot confidential;
(4) a ballot tabulation routine which allows tabulation of the content of said completed ballot in a manner which preserves the confidentiality of the voter's identity; and
(5) a challenge routine which allows the content of a completed ballot for an ineligible voter to be removed from the vote tabulation without revealing the identity of the voter or the content of said completed ballot; and
(6) a correction routine which allows an eligible voter to delete the content of an erroneous completed ballot and substitute it with the content of a correct completed ballot, without jeopardizing the privacy of the identity of said voter, or the content of said erroneous completed ballot, and the content of said corrected completed ballot.

11. An apparatus according to claim 10, further comprising:
(c) a separately identifiable authentication server, and a separately identifiable results server within said distributed data processing system;
(d) wherein said authentication server is utilized to authenticate the identity of said voter, issue electronic ballots, and route completed ballots; and
(e) wherein said results server is utilized to tabulate the content of completed ballots without access to the identity of voters.

12. An apparatus according to claim 10, further comprising:
(c) wherein a plurality of cryptographic transforms are utilized to selectively conceal the identity of said voter and the content of said completed ballot in order to maximize privacy.

* * * * *